(12) United States Patent
Hattori

(10) Patent No.: US 10,250,093 B2
(45) Date of Patent: Apr. 2, 2019

(54) STATOR FOR ROTARY ELECTRIC MACHINE AND METHOD FOR MANUFACTURING THE SAME

(71) Applicant: TOYOTA JIDOSHA KABUSHIKI KAISHA, Toyota-shi, Aichi-ken (JP)

(72) Inventor: Hiroyuki Hattori, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 505 days.

(21) Appl. No.: 14/906,476

(22) PCT Filed: Jul. 18, 2014

(86) PCT No.: PCT/IB2014/001351
§ 371 (c)(1),
(2) Date: Jan. 20, 2016

(87) PCT Pub. No.: WO2015/011542
PCT Pub. Date: Jan. 29, 2015

(65) Prior Publication Data
US 2016/0172919 A1    Jun. 16, 2016

(30) Foreign Application Priority Data
Jul. 23, 2013    (JP) ................................. 2013-153023

(51) Int. Cl.
*H02K 3/04*    (2006.01)
*H02K 3/28*    (2006.01)
(Continued)

(52) U.S. Cl.
CPC ................. *H02K 3/28* (2013.01); *H02K 3/12* (2013.01); *H02K 3/48* (2013.01); *H02K 15/02* (2013.01); *H02K 15/064* (2013.01)

(58) Field of Classification Search
CPC .................................. H02K 3/12; H02K 3/04
(Continued)

(56) References Cited

U.S. PATENT DOCUMENTS 2,251,152 A * 7/1941 Mortensen ............... H02K 3/18
                                                         310/208
5,773,905 A * 6/1998 Hill .......................... H02K 1/06
                                                         310/179
(Continued)

FOREIGN PATENT DOCUMENTS

JP    2006-158044 A    6/2006
JP    2011-072071 A    4/2011
(Continued)

OTHER PUBLICATIONS

Sep. 1, 2017 Office Action issued in European Patent Application No. EP 14761401.0.

*Primary Examiner* — Alexander Talpalatski
(74) *Attorney, Agent, or Firm* — Oliff PLC

(57) ABSTRACT

Stator for rotary electric machine has stator core and stator coil. The stator core has plural slots. The stator coil has a one-side conductor segment, a first other-side conductor segment, and a second other-side conductor segment. In the one-side conductor segment, a first leg and a second leg are inserted in first and second slots from one axial end side of the stator core. In the first other-side conductor segment, a third leg is inserted in the first slot from another axial end side of the stator core. In the second other-side conductor segment, a fourth leg is inserted in the second slot from the other axial end side of the stator core. The stator coil is formed such that the opposing legs are joined in each of the slots and a plurality of the one-side conductor segment and a plurality of the other-side conductor segment are sequentially joined.

8 Claims, 14 Drawing Sheets

(51) Int. Cl.
*H02K 3/12* (2006.01)
*H02K 3/48* (2006.01)
*H02K 15/06* (2006.01)
*H02K 15/02* (2006.01)

(58) Field of Classification Search
USPC .......................................................... 310/208
See application file for complete search history.

(56) References Cited

U.S. PATENT DOCUMENTS

| | | |
|---|---|---|
| 6,995,492 B1 | 2/2006 | Kouda et al. |
| 7,042,129 B2 * | 5/2006 | Neet ..................... H02K 1/165 |
| | | 310/208 |
| 2004/0145257 A1 * | 7/2004 | Oohashi ................... H02K 3/38 |
| | | 310/71 |
| 2011/0278973 A1 | 11/2011 | Utaka et al. |
| 2014/0021823 A1 * | 1/2014 | Kitamura ................. H02K 3/14 |
| | | 310/208 |

FOREIGN PATENT DOCUMENTS

| | | |
|---|---|---|
| JP | 2011-239651 A | 11/2011 |
| JP | 2013-208038 A | 10/2013 |
| WO | 2009/048019 A1 | 4/2009 |

* cited by examiner

STATOR FOR ROTARY ELECTRIC MACHINE AND METHOD FOR MANUFACTURING THE SAME

BACKGROUND OF THE INVENTION

1. Field of the Invention

The present invention relates to a stator for a rotary electric machine that includes a stator core having plural slots and a stator coil sequentially joining plural conductor segments and wound around te stator core and a method for manufacturing the same, and in particular to joining of plural conductor segments.

2. Description of Related Art

A structure has been known that includes, as a stator for a rotary electric machine, a stator core in which plural slots are formed in a circumferential direction and a stator coil that is wound around the stator core. The stator core is inserted in the plural slots.

Japanese Patent Application Publication No. 2011-239651 (JP 2011-239651 A) discloses that, when the stator coil is formed by joining plural conductor segments, a joint section of the conductor segments is provided at a coil end. The coil ends are provided on the outside of both axial ends of the stator core.

SUMMARY OF THE INVENTION

In a configuration described in JP 2011-239651 A, the joint section of the conductor segments is provided at the coil end. In such a configuration, when the stator for the rotary electric machine is manufactured, an external force may be applied to the joint section of the conductor segments. Accordingly, there is room for improvement in the conductor segments to improve reliability of joint strength. In addition, in order to increase the joint strength of the joint section of the conductor segments, a large joint area is requested. This leads to enlarge the coil end.

An object of the present invention is to provide a stator for a rotary electric machine that can improve reliability of joint strength of conductor segments and can further reduce size of a coil end, and a method for manufacturing the same.

An aspect of the present invention relates to a stator of a rotary electric machine. The stator for the rotary electric machine has a stator core and a stator coil. The stator core has plural slots. The stator coil has a one-side conductor segment, a first other-side conductor segment and a second other-side conductor segment. In the one-side conductor segment, a first leg and a second leg are inserted in first and second slots from one axial end side of the stator core. In the first other-side conductor segment, a third leg is inserted in the first slot from another axial end side of the stator core. In the second other-side conductor segment, a fourth leg is inserted in the second slot from the other axial end side of the stator core. The stator coil is formed such that the legs are opposed and joined in each of the slots and a plurality of the one-side conductor segment and a plurality of the other-side conductor segment are sequentially joined.

In the above aspect, the plural slots may be formed in a radial direction of the stator core. In addition, a plurality of the first leg and a plurality of the third leg may be joined in a first joint section in the first slot, and a plurality of the second leg and a plurality of the fourth leg may be joined in a second joint section in the second slot. Furthermore, the first joint section and the second joint section that are adjacent to each other in the radial direction in each of the slots may be provided at different positions in the axial direction.

In the above aspect, tip surfaces of the opposing legs in each of the slots may be joined in an engaged state with each other by a projection and recess engaging section that is formed by a recessed section and a projected section.

In an aspect of the present invention, the stator for the rotary electric machine has the stator core and the stator coil. The stator core has the plural slots. The stator coil has the one-side conductor segment, the first other-side conductor segment, and the second other-side conductor segment. In the one-side conductor segment, the first leg and the second leg are inserted in the first and second slots from the one axial end side of the stator core. In the first other-side conductor segment, the third leg is inserted in the first slot from the other axial end side of the stator core. In the second other-side conductor segment, the fourth leg is inserted in the second slot from the other axial end side of the stator core. The stator coil is configured to join the first leg and the third leg to each other in the first slot and join the second leg and the fourth leg to each other in the second slot.

In the above aspect, the plural slots may be formed in the radial direction of the stator core. In addition, the stator of the rotary electric machine may have the plurality of the one-side conductor segment, the plurality of the first other-side conductor segment, and the plurality of the second other-side conductor segment. The plurality of the first leg and the plurality of the third leg may be joined in the first joint sections in the first slot, and the plurality of the second leg and the plurality of the fourth leg may be joined in the second joint sections in the second slot. Furthermore, the first joint section and the second joint section that are adjacent to each other in the radial direction in the each slot may be provided at different positions in the axial direction.

In the above aspect, of the legs that are joined in the slot, a tip of one leg may be a recessed section, a tip of the other leg may be a projected section, and the recessed section and a projected section may be engaged.

In an aspect of the present invention, a method for manufacturing the stator for the rotary electric machine has an insertion step and a joining step. The stator of the rotary electric machine has the stator core with the plural slots. In the insertion step, the first leg of the one-side conductor segment is inserted in the first slot from the one axial end side of the stator core, and the third leg of the first other-side conductor segment is inserted in the first slot from the other axial end side of the stator core. Furthermore, the second leg of the one-side conductor segment is inserted in the second slot from the one axial end side of the stator core, and the fourth leg of the second other-side conductor segment is inserted in the second slot from the other axial end side of the stator core. In the joining step, the first leg and the third leg are joined to each other in the first slot, and the second leg and the fourth leg are joined to each other in the second slot.

In the above aspect, in the insertion step, a plurality of the first leg and a plurality of the second leg may simultaneously be inserted. Furthermore, a plurality of the third leg and a plurality of the fourth leg may simultaneously be inserted. In the joining step, the legs that are opposed in each of the slots may simultaneously be joined.

In the above aspect, the method for manufacturing may have a preparation step. In the preparation step, a pasty binder that contains conductive particles may be applied in advance to either one or both of tips of the legs of a plurality of the one-side conductor segment or/and the legs of the other-side conductor segments. In addition, in the joining step, the legs that are opposed in each of the slots may be brought into contact with each other, pressurized, and heated to harden the binder, and the opposing legs in each of the slots may be joined.

In the above aspect, the plurality of the one-side conductor segment and a plurality of the other-side conductor segment may sequentially be joined to form the stator coil.

According to the stator for the rotary electric machine and the method for manufacturing the same in the present invention, the joint section of the conductor segments is provided in the slot. Therefore, reliability of joint strength of the conductor segments can be improved. Furthermore, compared to a case where the joint section is provided in a coil end, the size of the coil end can be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
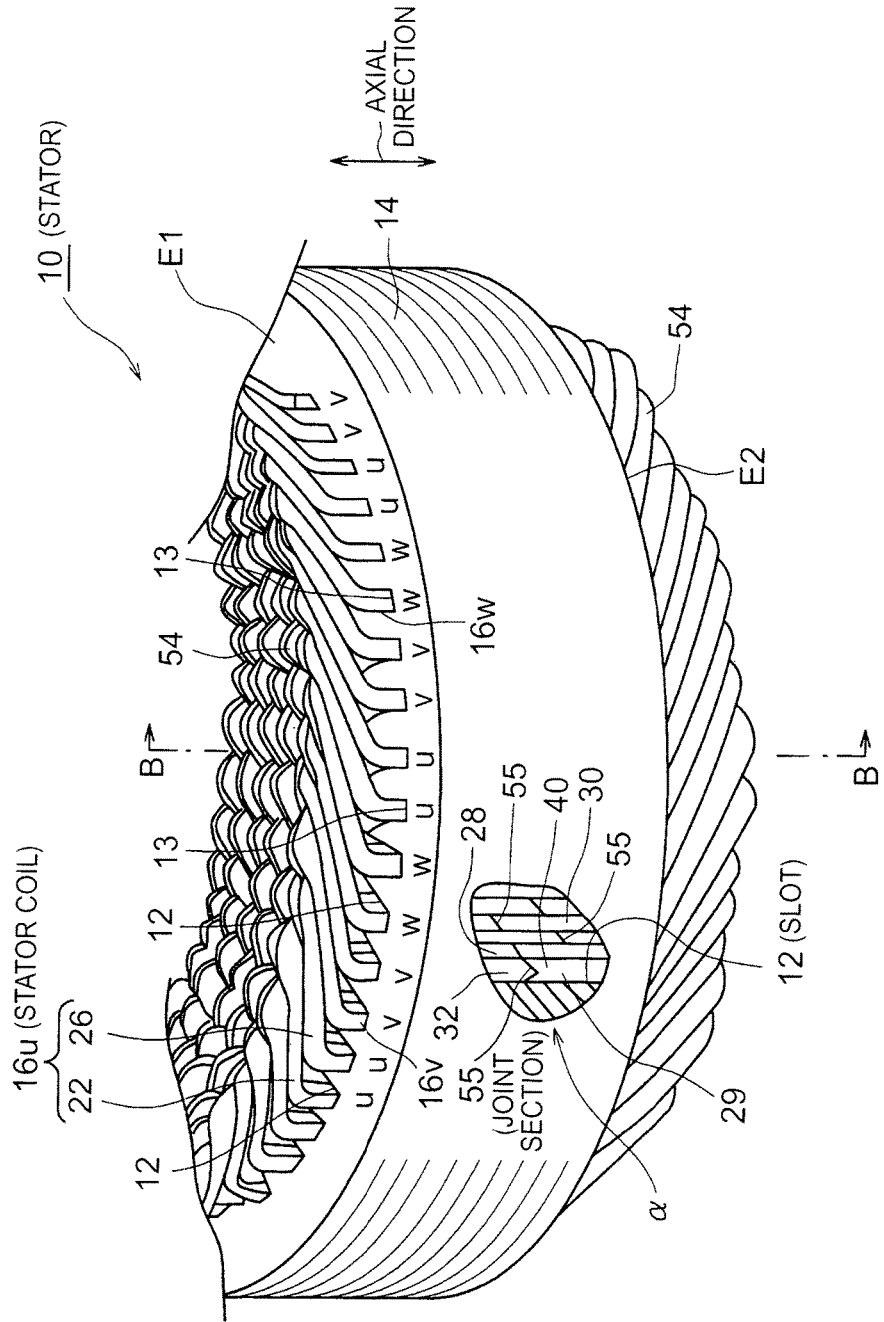
FIG. 1 is a perspective view for showing arrangement of components in a slot in a fractured section in a stator of a rotary electric machine according to an embodiment of the present invention.

A description will hereinafter be made on an embodiment according to the present invention with reference to the drawings. In the following description, a stator coil is arranged in a stator core by distributed winding. However, the following description does not limit a winding method of the stator coil. The stator coil may be arranged in the stator core by concentrated winding or wave winding. In the following description, same components in all of the drawings are denoted by the same reference numerals.

Figure 2:
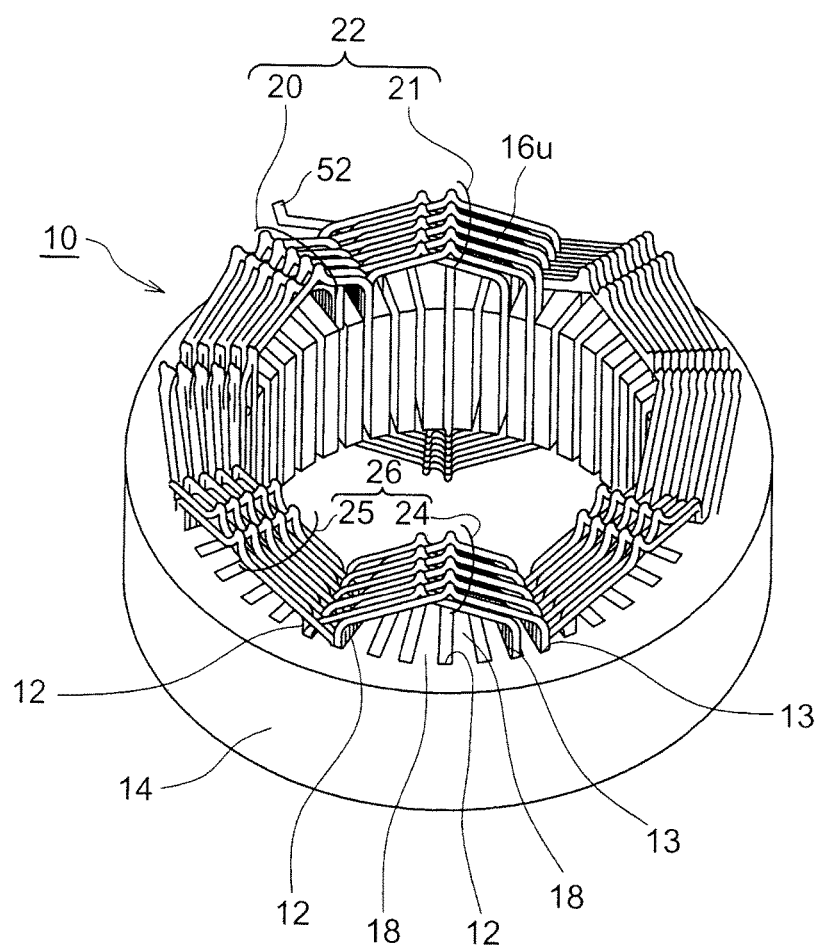
FIG. 2 is a perspective view for showing a circumstance where a single-phase coupling stator coil is wound in the stator for the rotary electric machine shown in FIG. 1.

FIG. 1 is a perspective view for showing arrangement of components in slots 12, 13 in a fractured section α in a stator 10 for a rotary electric machine. FIG. 2 is a view for showing a circumference where a single-phase coupling stator coil 16u is wound in the stator 10 for the rotary electric machine in FIG. 1. The stator 10 for the rotary electric machine will hereinafter be simply referred to as the "stator 10". The stator 10 is combined with a rotor (not shown) to form the rotary electric machine. The rotary electric machine is mounted in a vehicle and used as an electric motor, a generator, or a motor generator having functions of both of the electric motor and the generator.

The stator 10 includes an annular stator core 14 and three-phase coupling stator coils 16u, 16v, 16w for a u phase, a v phase, and a w phase that are wound on an inner peripheral side of the stator core 14 by the distributed winding. The stator core 14 includes salient poles 18 (FIG. 2) and the slots 12, 13, and is formed of a laminated body of electromagnetic steel sheets. The salient poles 18 are provided in positions at equally spaced intervals in the circumferential direction of the stator core 14 in a manner to protrude to the inside in a radial direction of the stator core 14. The slots 12, 13 are plural radial grooves, each of which is formed between the adjacent salient poles 18. The stator core 14 may be formed by a pressed powder core. The pressed powder core is formed by pressure-molding magnetic powder.

Figure 3:
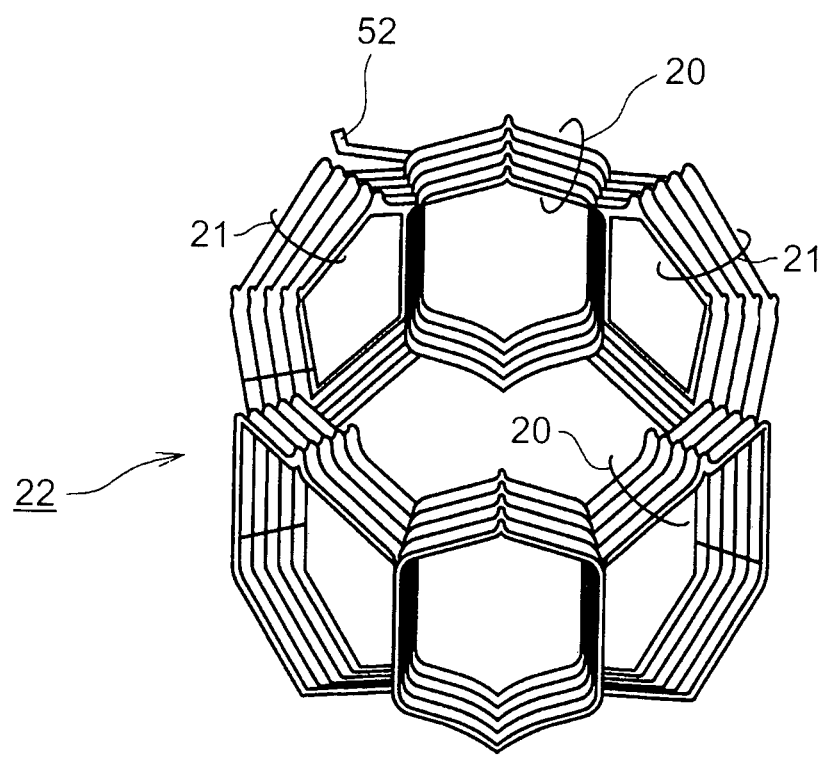
FIG. 3 is a view for showing a first-half annular section that forms the single-phase coupling stator coil shown in FIG. 2.

In FIG. 2 and FIG. 3, the coupling stator coils 16u, 16v, 16w for the respective phases are shown by the coupling stator coil 16u for the u phase being representative. As shown in FIG. 2 and FIG. 3, the coupling stator coil 16u is formed by electrically connecting a first-half annular section 22 and a latter-half annular section 26 in series. The first-half annular section 22 is formed by connecting plural stator coils 20, 21 in an annular shape. The latter-half annular section 26 is formed by connecting other plural stator coils 24, 25 in the annular shape. In FIG. 1 and FIG. 2, the first-half annular section 22 and the latter-half annular section 26 for the u phase are wound at plural positions in the circumferential direction of the stator core 14 in a state of being inserted in the adjacent slots 12, 13. The coupling stator coils 16v, 16w are formed in a same manner as the coupling stator coil 16u. Arrangement positions of the coupling stator coils 16v, 16w are dislocated in the circumferential direction of the stator core 14.

Figure 4:
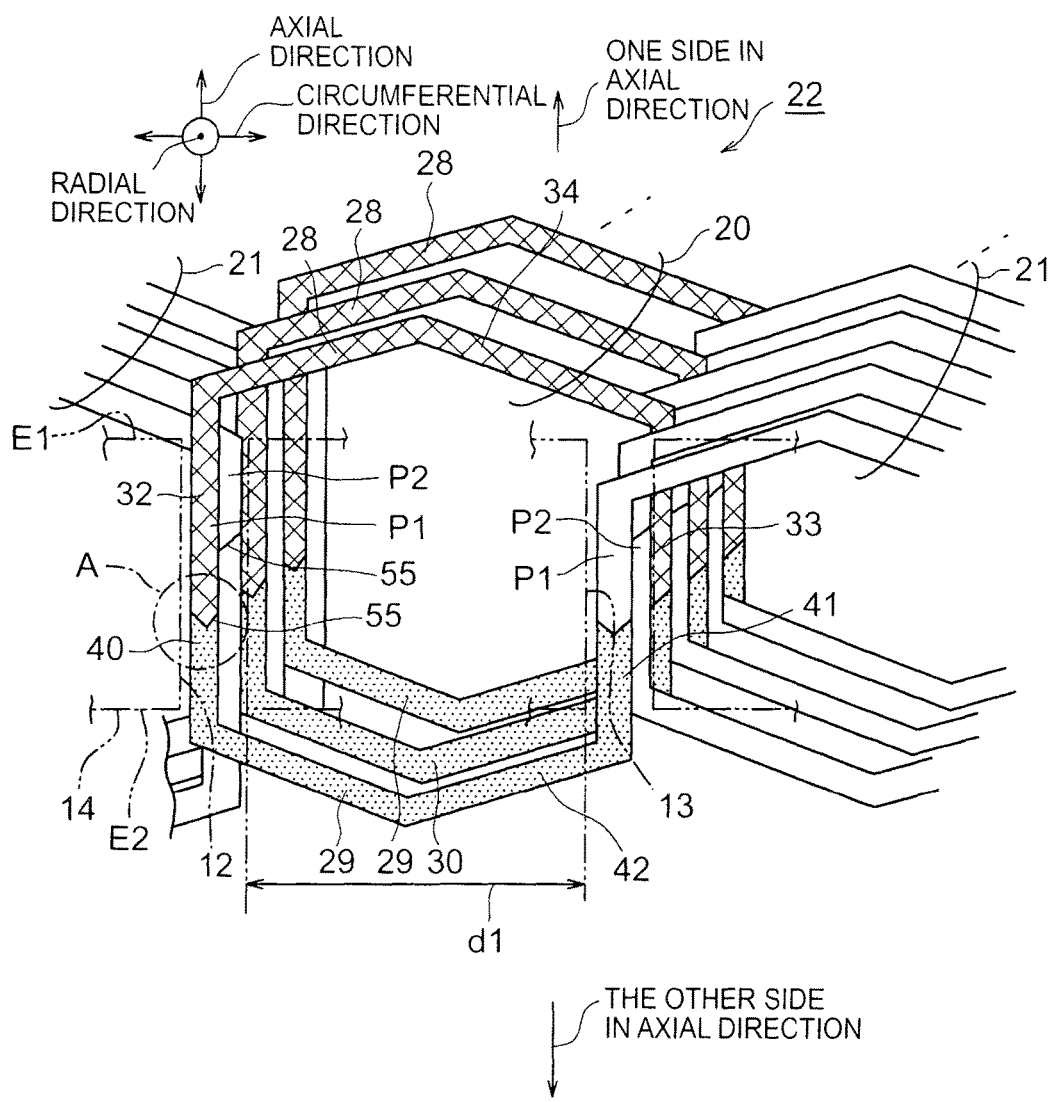
FIG. 4 shows a portion of the first-half annular section that is shown in FIG. 3 in a circumferential direction.

FIG. 4 shows a portion of the first-half annular section 22 in the circumferential direction that includes the plural stator coils 20, 21. As will be described below, each of the stator coils 20, 21 is formed by joining plural conductor segments 28, 29, 30. Each of the plural stator coils 20, 21 is wound around the stator core 14 so as to be inserted in the two slots 12, 13 that are separated from each other by a specified unit interval d1. The specified unit interval d1 is an interval that crosses the plural slots (not shown in FIG. 4) along the circumferential direction. The plural slots 12, 13 include the first slot 12 and the second slot 13.

In addition, the stator coil 20 and the other stator coil 21 that is adjacent to the stator coil 20 are inserted in the same slot 12 (or the same slot 13). When the stator coil 20 and the stator coil 21 are inserted, an I-shaped leg section P1 that constitutes the stator coil 20 and an I-shaped leg section P2 that constitutes the other stator coil 21 are arranged to be adjacent to each other in the radial direction in the slot 12 (or the slot 13). The latter-half annular section 26 that is shown in FIG. 2 is formed in the same manner as the first-half annular section 22.

The plural conductor segments 28, 29, 30 include the plural one-side conductor segments 28, the plural first-other-side conductor segments 29, and the plural second-other-side conductor segments 30. Each of the one-side conductor segment 28 and the other-side conductor segments 29, 30 is configured such that a conductor wire is bent in a specified shape. The conductor wire is a rectangular wire that is coated with an insulating film and has a rectangular cross section. In an example of FIG. 4, each of the conductor segments 28, 29, 30 is configured by being bent in a shape that I shapes that are parallel to each other are continuously formed at both of V-shaped ends. Since the rectangular wire is used for each of the conductor segments 28, 29, 30, a space factor of the conductor wire in each of the slots 12, 13 can be improved. Alternatively, as the conductor segment, the conductor wire can be used by being shaped in U.

In FIG. 4, some of the conductor segments 28 are shown by diagonal gratings, and some of the other conductor segments 29, 30 are shown in a dotted manner. This is to facilitate understanding of arrangement of the conductor segments 28, 29, 30 and positions of joint sections. The conductor segments 28, 29, 30 are formed of a same material.

The one-side conductor segments 28 are arranged on one side in the axial direction of the stator 10, and the other conductor segments 29, 30 are arranged on another side in the axial direction. Each of the one-side conductor segments 28 has one-side leg sections 32, 33 and a V-shaped coupling section 34 that couples the two one-side leg sections 32, 33. The one-side leg sections 32, 33 are two of a first leg and a second leg in the I shape that are parallel to each other and respectively inserted in the two slots 12, 13 from one axial end side of the stator core 14.

Figure 5:
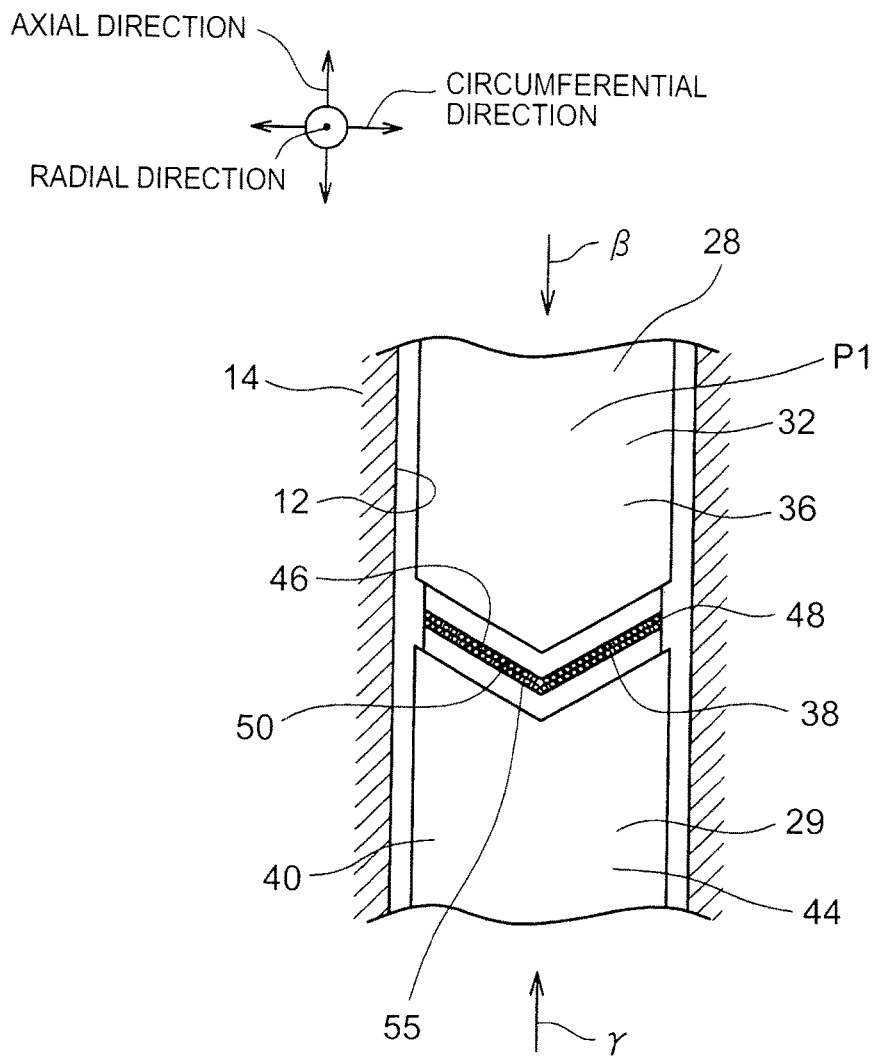
FIG. 5 is an enlarged view of a section A in FIG. 4.

As shown in FIG. 5, a tip surface of the one-side leg section 32 (and also the one-side leg section 33) is exposed from an insulating film 36 and has a projected section 38 that is in a V-shaped angular shape when seen in the radial direction.

Returning to FIG. 4, similar to the one-side conductor segment 28, each of the other-side conductor segments 29, 30 has other-side leg sections 40, 41 and a V-shaped coupling section 42 that couples the two other-side leg sections 40 41. The other-side leg sections 40, 41 are two of a third leg and a fourth leg in the I shape that are respectively inserted in the two slots 12, 13 from the other axial end side of the stator core 14. As shown in FIG. 5, a tip surface of the other-side leg section 40 (and also the other-side leg section 41) is exposed from an insulating film 44 and has a recessed section 46 that is in a V-shaped valley shape when seen in the radial direction.

As shown in the fractured section a in FIG. 1, each of tips of the one-side leg sections 32 (or the one-side leg sections 33) of the plural one-side conductor segments 28 and each of tips of the other-side leg section 40 (or the other-side leg section 41) of the plural other-side conductor segments 29, 30 that face each other in the slot 12 (or the slot 13) are joined in the slot 12 (or the slot 13). Then, each of the coupling stator coils 16u, 16v, 16w that includes the stator coils 20, 21 is formed such that the plural one-side leg sections 32, 33 and the plural other-side leg sections 40, 41 are sequentially joined.

More specifically, in FIG. 4 and FIG. 5, as shown by the coupling stator coil 16u for u phase being representative, the tips of the one-side leg section 32 of the plural one-side conductor segments 28 and the tips of the other-side leg section 40 of the plural other-side conductor segments 29, 30 are inserted in the first slot 12. The tip of the one-side leg section 32 and the tip of the other-side leg section 40 that face each other in the first slot 12 are joined in a joint section 55 by a binder 48, which will be described below. In this case, the tip surfaces of the one-side leg section 32 and the other-side leg section 40 are joined in an engaged state by a projection and recess engaging section 50 that is formed by the projected section 38 and the recessed section 46. When the one-side leg section 32 and the other-side leg section 40 are joined, the I-shaped leg section P1 or the I-shaped leg section P2 (FIG. 4) is formed. In addition, insulating paper or varnish (not shown) is provided in a space between each of the leg sections P1, P2 and an inner surface of the slot 12, thereby insulating a space between each of the leg sections P1, P2 and the stator core 14. The same applies to a joint section of tips of the one-side leg section 33 and the other-side leg section 41 that face each other in the second slot 13. The first-half annular section 22 that includes the plural stator coils 20 is thereby formed.

The latter-half annular section 26 that is shown in FIG. 1 and FIG. 2 is also formed in a same manner as the first-half annular section 22 for the u phase in FIG. 4. In addition, the one stator coil 20 and the one stator coil 24 are connected in the slot 12 (or the slot 13) by the joint of the one-side leg section 32 and the other-side leg section 40. The one stator coil 20 is located at an end that is opposite from an end of the first-half annular section 22 that is connected to a power source. The one stator coil 24 forms the latter-half annular section 26 and is located at an end that is opposite from a neutral point (not shown). Also in this case, the tip surfaces of the one-side leg section 32 and the other-side leg section 40 are joined in the engaged state by the projection and recess engaging section. The neutral point is a connecting point of the three-phase coupling stator coils 16u, 16v, 16w. One end of the stator coil 20 that is located at the end of the first-half annular section 22 that is connected to the power source is provided with a connecting end 52 (FIG. 2). The connecting end 52 is provided by bending the end of the stator coil 20 and drawing the end to the outside in the axial direction of the stator core 14. The connecting end 52 is connected to a power line (not shown), and the power line is connected to an inverter (not shown) that is provided on the power source side.

The binder 48 has conductive particles. The binder 48 is applied to the tip surface of the one-side leg section 32 (or 33) in advance before the one-side leg section 32 (or 33) and the other-side leg section 40 (or 41) are joined. The application of the binder 48 will be described below with reference to FIG. 11. As shown in FIG. 5, the tips of the one-side leg section 32 and the other-side leg section 40 are brought into contact with each other, pressurized in a direction to press each other (arrow β, γ directions), and then heated to be joined. As the binder 48, a pasty binder can be used that contains a thermosetting resin as a binder and metal particles of silver or copper that are micronized to a nanometer level as conductive particles. In this case, the two conductor segments 28, 29 (or 30) are connected to each other in a state that conductivity therebetween is favorable. The binder 48 may only be applied to the tip surface of the other-side leg section 40 or may be applied to both of the tip surfaces of the one-side leg section 32 and the other-side leg section 40. As the binder 48, a pasty thermosetting binder can also be used that contains the metal particles of silver or copper that are micronized to the nanometer level as a Main component.

In FIG. 5, although the tips of the one-side leg section 32 and the other-side leg section 40 are joined in the engaged state by the projection and recess engaging section 50, a shape of the joint section is not limited to this example. The tip of each of the leg sections 32, 40 may simply be a flat surface, and the leg sections 32, 40 may be joined to each other at the flat surfaces.

The description has been made on a case of the coupling stator coil 16u for the u phase. And, the coupling stator coils 16v, 16w for the v phase and the W phase are formed in a same manner as the coupling stator coil 16u. The ends of the three stator coils 24 that are located at an end on the neutral point side of the latter-half annular section 26 of each of the coupling stator coils 16u, 16v, 16w for the respective phases are connected to each other on the outside in the axial direction of the stator core 14. Here, each of the coupling stator coils 16u, 16v, 16w for the respective phases may be formed of only one annular section in which the plural stator coils are coupled in the annular shape.

Since the conductor segments 28, 29, 30 are joined in the slot 12 as described above, it is possible to improve reliability of joint strength of the conductor segments 28, 29, 30. This will be described in detail below. Furthermore, when the conductor segments 28, 29, 30 are joined in the slot 12, a coil end 54 (FIG. 1) of the coupling stator coils 16u, 16v, 16w that is provided on the outside in the axial direction of the stator core 14 can be reduced in size in comparison with a case where the joint section is provided in the coil end 54.

Figure 6:
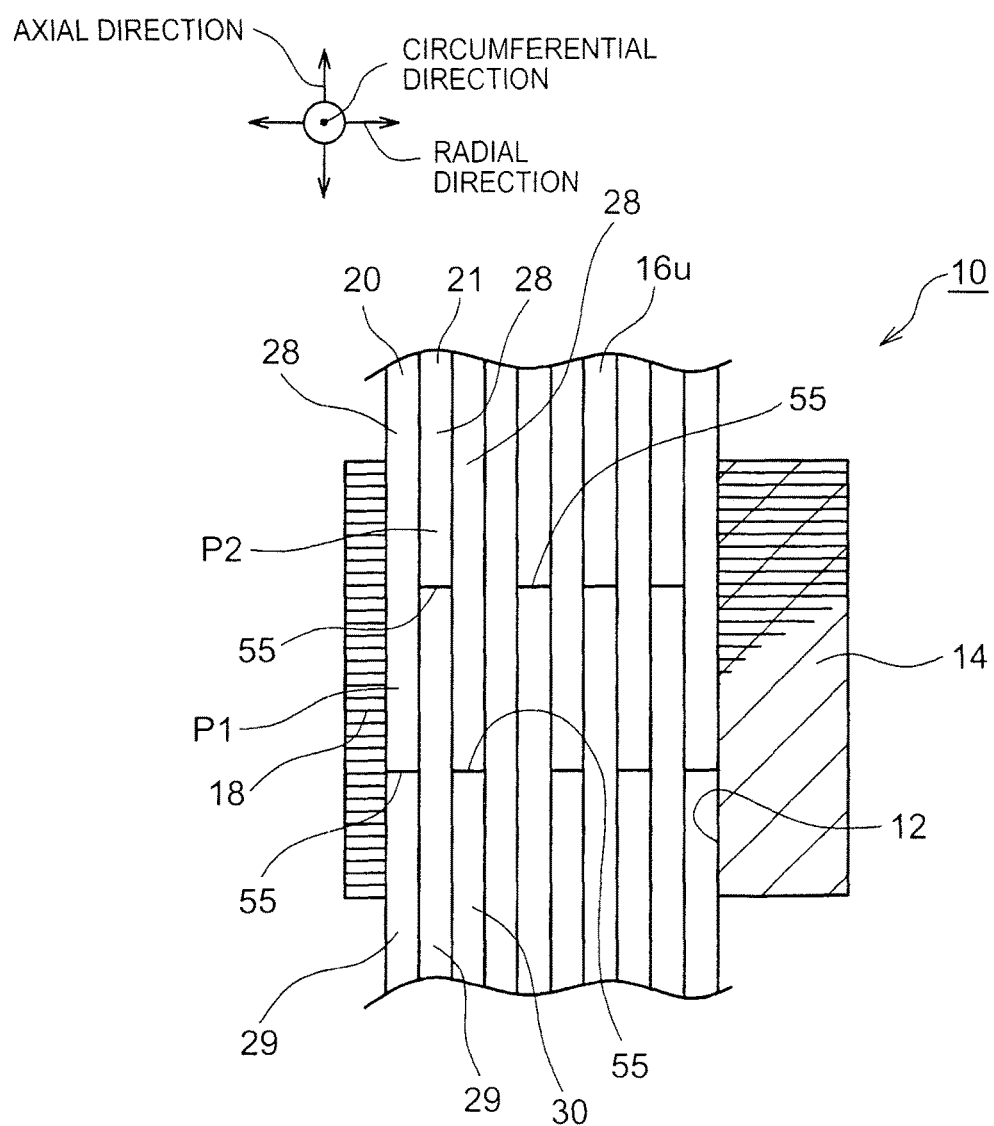
FIG. 6 is a cross-sectional view taken along the line B-B in FIG. 1.

FIG. 6 is a cross-sectional view taken along the line B-B of FIG. 1. The joint sections 55 of the tips of any two of the conductor segments 28, 29, 30 that are adjacent in the radial direction in the slot 12 are provided at different positions in the axial direction. Accordingly, an insulation distance can be increased without reducing occupancy of the conductor wire in the slot 12. Thus, the reliability of the joint strength of the conductor segments 28, 29, 30 is improved. This will be described in detail below.

Figure 7:
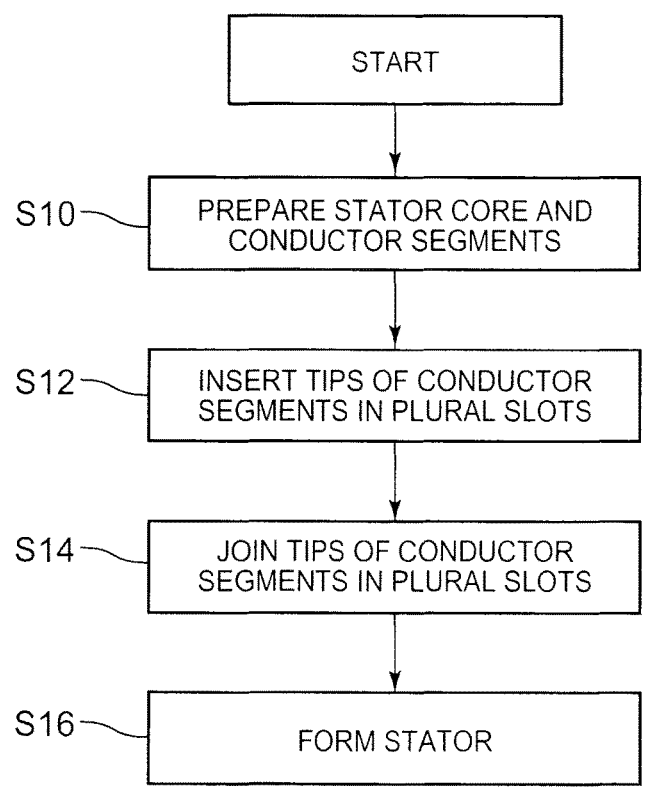
FIG. 7 is a flowchart for illustrating a method for manufacturing the stator of the rotary electric machine according to the embodiment of the present invention.

FIG. 7 is a flowchart for illustrating a method for manufacturing the stator 10. First, a step S10 (hereinafter a step S is simply referred to as S) is a preparation step. In S10, the stator core 14 having the plural slots 12, the plural one-side conductor segments 28, and the other-side conductor segments 29, 30 are prepared. In this case, the one-side leg sections 32, 33 of the one-side conductor segments 28 are set to be longer than the other-side leg sections 40, 41 of the other-side conductor segments 29, 30. The one-side leg sections 32, 33 of the one-side conductor segments 28 form the stator coils 20 that are alternately arranged in the circumferential direction. This will be described below with reference to FIG. 8.

Figure 10:
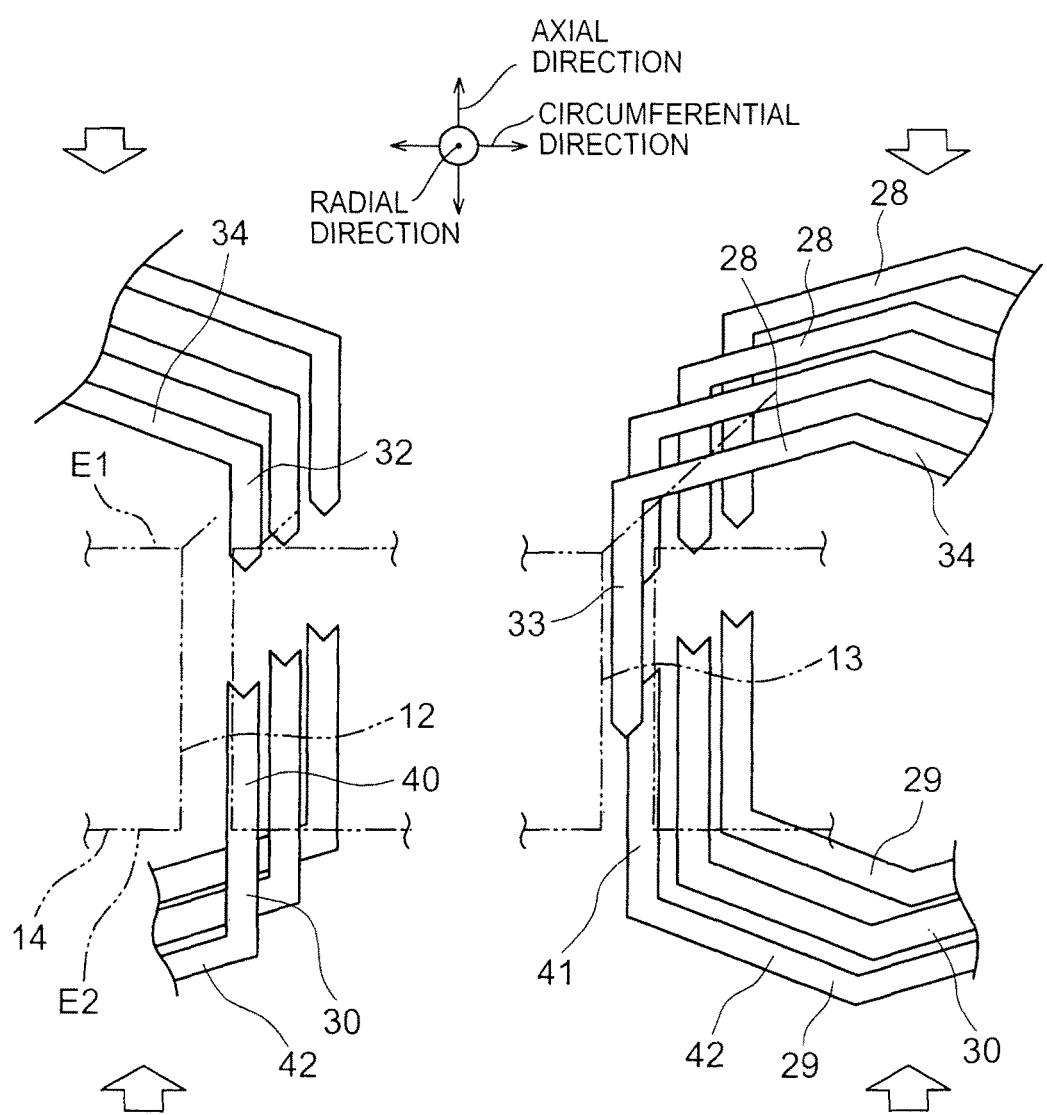
FIG. 10 is a view for showing a circumstance where the leg sections of the conductor segments on both sides in the circumferential direction in FIG. 8 are inserted in the slots.

In addition, as shown in FIG. 10, which will be described below, the one-side leg sections 32, 33 of the one-side conductor segments 28 that form the other stator coil 21 are set to be shorter than the other-side leg sections 40, 41 of the other-side conductor segments 29, 30. Accordingly, as shown in FIG. 6, when the conductor segments 28, 29, 30 of the adjacent stator coils 20, 21 are alternately arranged in the radial direction in the same slots 12, 13, the positions of the joint sections 55 of the conductor segments 28, 29, 30 that are adjacent in the radial direction can vary in the axial direction within the slots 12, 13.

Figure 11:
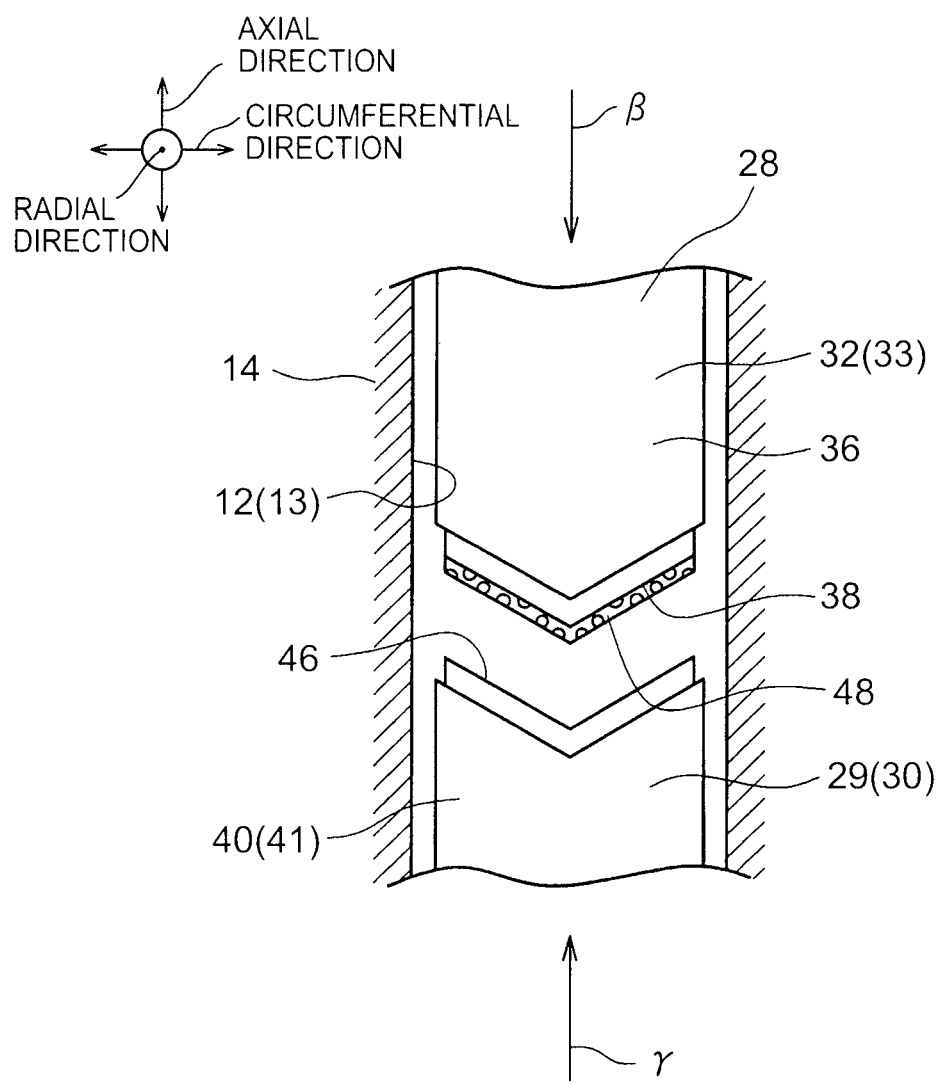
FIG. 11 is an enlarged view for showing a state immediately before the two conductor segments in FIG. 8 are joined.

In the preparation step (S10), as shown in FIG. 11, the pasty binder 48 is applied in advance to the tip surface of the one-side conductor segments 28.

Next, an insertion step is performed (S12). In the insertion step, the one-side leg sections 32, 33 formed in the plural one-side conductor segments 28 are inserted in the slots 12, 13 from one axial end E1 side of the stator core 14. In addition, the other-side leg sections 40, 41 formed in the plural other-side conductor segments 29, 30 are inserted in the slots 12, 13 from another axial end E2 side of the stator core 14.

Figure 8:
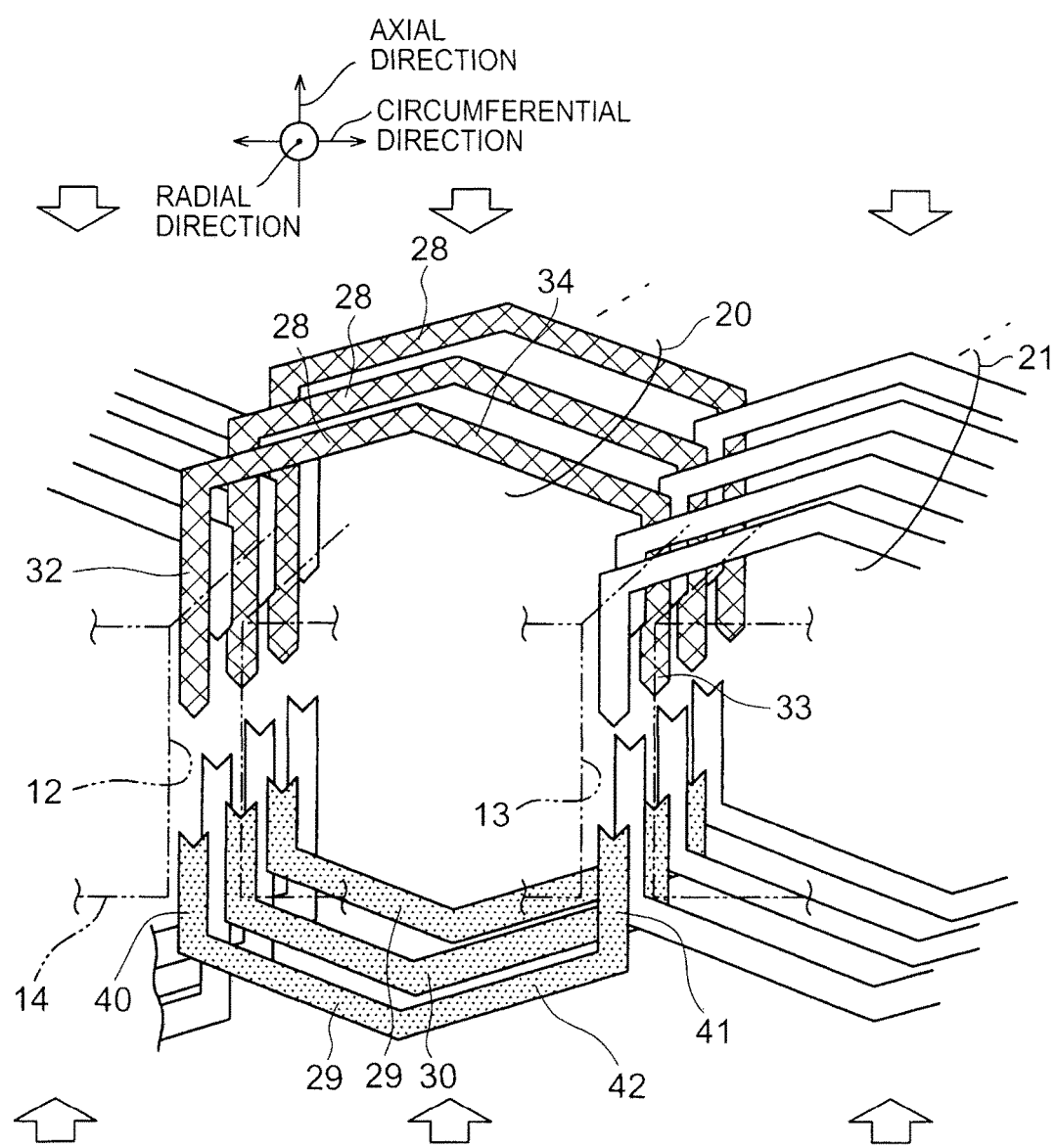
FIG. 8 is a view for showing a circumstance where leg sections of the plural conductor segments are inserted in the slots when the first-half annular section shown in FIG. 3 is formed.
Figure 9:
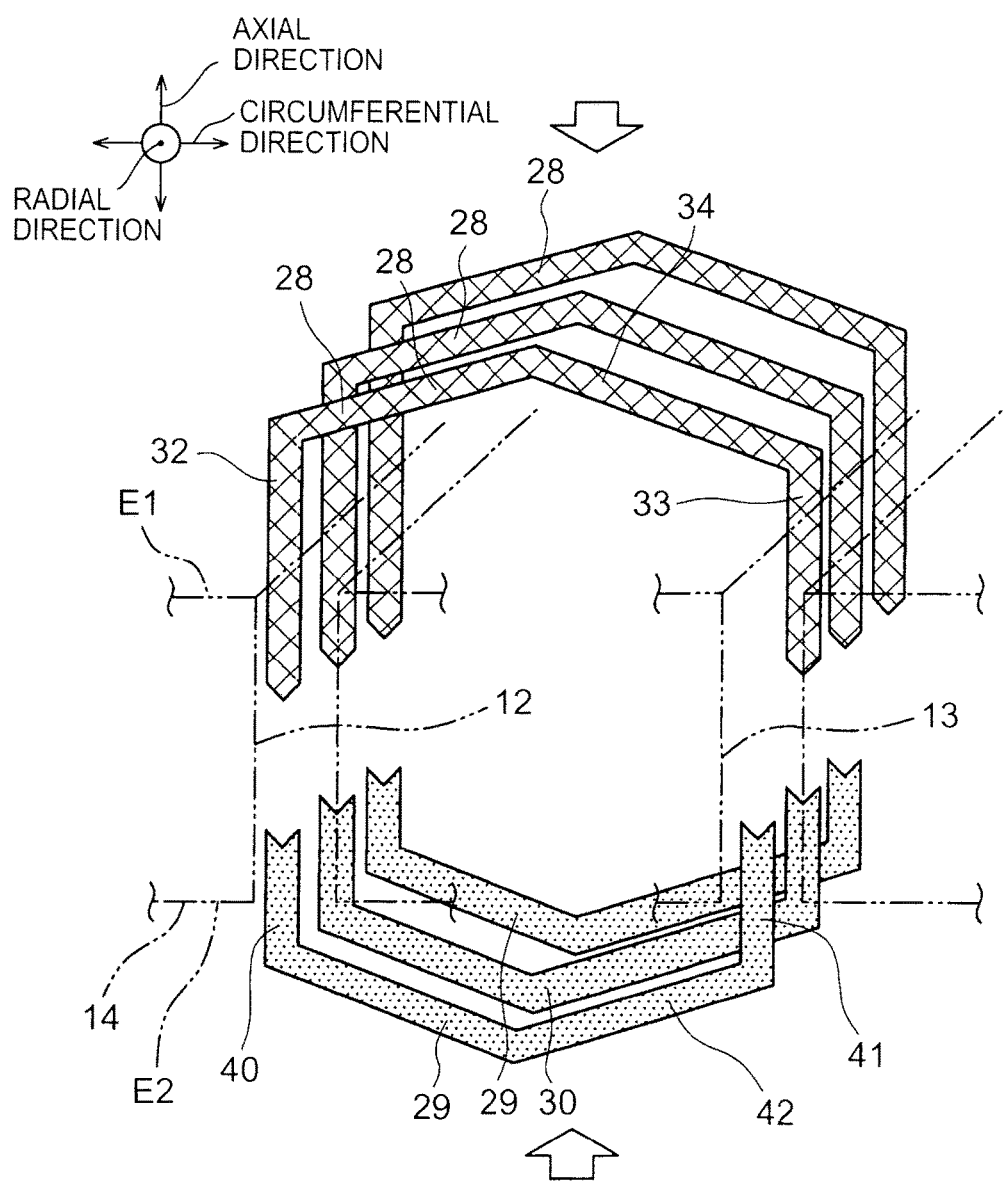
FIG. 9 is a view for showing a circumstance where leg sections of the conductor segment at the center in the circumferential direction in FIG. 8 are inserted in the slots.

In this case, as shown in FIG. 8 to FIG. 10, the one-side leg sections 32, 33 of all of the one-side conductor segments 28 that form the coupling stator coil 16u may simultaneously be inserted in the plural slots 12, 13 from the axial end E1 side of the stator core 14 (an upper end side in FIG. 8 to FIG. 10). In addition, the other-side leg sections 40, 41 of all of the other-side conductor segments 29, 30 that form the coupling stator coil 16u may simultaneously be inserted in the plural slots 12, 13 from the other axial end E2 side of the stator core 14 (a lower end side in FIG. 8 to FIG. 10). The starting of insertion of the one-side leg sections 32, 33 into the slots 12, 13 and the starting of insertion of the other-side leg sections 40, 41 into the slots 12, 13 may be performed at the same time or may precede or succeed.

In FIG. 9 and FIG. 10, for better understanding of positions of the tips of the plural the conductor segments 28, 29, 30, the stator coil 20 at the center in FIG. 8 and the stator coils 21 on both sides are separately shown. In the insertion step (S12), in the first-half annular section 22 and the latter-half annular section 26, the one-side leg sections 32, 33 and the other-side leg sections 40, 41 are inserted in the slots 12, 13. Accordingly, the I-shaped leg sections P1, P2 (FIG. 4 and FIG. 6) of the adjacent stator coils 20, 21 are alternately arranged in the radial direction in the same slot 12 (or the same slot 13).

Next, in S14, as shown in FIG. 11, the tip of either one of the one-side leg sections 32, 33 and the tip of either one of the other-side leg sections 40, 41 are brought closer to each other in either one of the slots 12, 13. Then, as shown in FIG. 5, these tips are abutted against each other, pressurized from both sides in the axial direction to the arrow β, γ directions, and further heated. Just as described, a joining step for simultaneously joining the tips of the plural one-side leg sections 32, 33 and the plural other-side leg sections 40, 41 is performed. The binder 48 is hardened by heating described above. Heating is performed by a heater (not shown) that is arranged around the stator core 14. Upon heating, each of the conductor segments 28, 29, 30 is retained by a jig (not shown).

FIG. 8 exemplifies a case where the first-half annular section 22 of the coupling stator coil 16u for the u phase is formed. In the insertion step of S12, the tips of the one-side leg sections 32, 33 of all of the one-side conductor segments 28 that form the first-half annular section 22 and the latter-half annular section 26 may simultaneously be inserted in the plural slots 12, 13 when the coupling stator coil 16u is formed. Then, the tips of the other-side leg sections 40, 41 of all of the other-side conductor segments 29, 30 that form the first-half annular section 22 and the latter-half annular section 26 may simultaneously be inserted in the plural slots 12, 13.

In addition, in the insertion step of S12, the tips of all of the one-side leg sections 32, 33 of the one-side conductor segments 28 that form the coupling stator coils 16u, 16v, 16w for the respective phases may simultaneously be inserted in the plural slots 12, 13. Then, the tips of all of the other-side leg sections 40, 41 of the other-side conductor segments 29, 30 that form the coupling stator coils 16u, 16v, 16w for the respective phases may simultaneously be inserted in the plural slots 12, 13.

Furthermore, in the joining step of S14, the tips of the one-side leg sections 32, 33 and the other-side leg sections 40, 41 of all of the conductor segments 28, 29, 30 that form the first-half annular section 22 and the latter-half annular section 26 may simultaneously be joined by heating and pressurization. Moreover, the tips of the one-side leg sections 32, 33 and the other-side leg sections 40, 41 of all of the conductor segments 28, 29, 30 that form the coupling stator coils 16u, 16v, 16w for the respective phases may simultaneously be joined.

According to the stator 10 and the method for manufacturing the same that are described above, the joint sections 55 of the conductor segments 28, 29, 30 are provided in the slots 12, 13. Differing from a case where the joint section 55 is arranged at the coil end 54, such a stator 10 and such a method for manufacturing the same can prevent a jig or a part near the stator 10 from unintentionally hitting the joint section 55 during a process of manufacturing. Thus, an external force is less likely to be applied to the joint section 55. In addition, the inside of each of the slots 12, 13 is less likely to be influenced by vibration, an electromagnetic force and a temperature change than the coil end 54 during use. Thus, stress generated in the joint section 55 can be lowered. For this reason, the reliability of strength of the joint section 55 can be improved, and damage to the joint section 55 can effectively be prevented. This leads to improvement in durability of the coupling stator coils 16u, 16v, 16w. Furthermore, differing from the case where the joint section 55 is provided at the coil end 54, a large joint area does not have to be provided in order to increase the joint strength of the conductor wire. Consequently, the size of the coil end 54 can be reduced.

Unlike the present invention, when the joint section is provided at the coil end, the joint section has to be formed after the conductor wire is bent in a complex shape at the coil end. A purpose of this is to secure a space for a joining work that can avoid interference with the stator coil. Meanwhile, in this embodiment, there is no portion or there are only a few portions in each of the conductor segments 28, 29, 30 that have to be bent after the conductor segments 28, 29, 30 are inserted in the slots 12, 13. Accordingly, since a manufacturing process can be simplified, it is possible to improve productivity while reducing manufacturing cost. In addition, damage to the insulating films 36, 44 of the conductor segments 28, 29, 30 can effectively be prevented.

In the structure disclosed in JP 2011-239651 A, after the conductor segments are inserted in the slots from one side of the stator core, the conductor segments have to be projected from the other side of the stator core. Thus, there is room for improvement in workability of a work to insert the other conductor segments in the slots from the other side of the stator core thereafter. In this embodiment, after the conductor segments 28, 29, 30 are inserted from both of the sides in the stator core 14, there is no need to project the conductor segments from the opposite side from the insertion side. Thus, workability of a work to simultaneously insert the plural conductor segments 28, 29, 30 in the plural slots 12, 13 is improved.

In addition, since there is no need to form the joint section 55 in a bent portion of each of the conductor segments 28, 29, 30, joint positions of the conductor segments 28, 29, 30 are stabilized. Thus, there is no need or there is hardly any need to compensate for displacement of the joint position of the conductor segments by the joint section 55. As a result, in the coupling stator coils 16u, 16v, 16w, the remaining stress near the joint section 55 is lowered, and thus the joint strength of the conductor segments can be increased further.

Furthermore, the joint sections 55 that are exposed from the insulating films 36, 44 at the tips of the conductor segments 28, 29, 30 are provided at the different positions in the axial direction, the conductor segments 28, 29, 30 being adjacent in the radial direction in the slots 12, 13. Differing from a case where the joint sections of the conductor wires in the slots 12, 13 are provided at the same position in the axial direction, there is no need to provide an insulation structure such as the insulating paper between the plural joint sections 55. Accordingly, the insulation distance can be increased without reducing the occupancy of the conductor wire in the slot 12, 13, and thus the reliability can be improved.

Moreover, the tips of the one-side leg sections 32, 33 and the other-side leg sections 40, 41 are joined in the engaged state by the projection and recess engaging section 50. Accordingly, the tips thereof can easily be abutted against each other before being joined. Furthermore, it is possible to prevent the positions of the tips from being displaced thereafter. Therefore, the workability in manufacturing of the stator coil can be improved.

Figure 12:
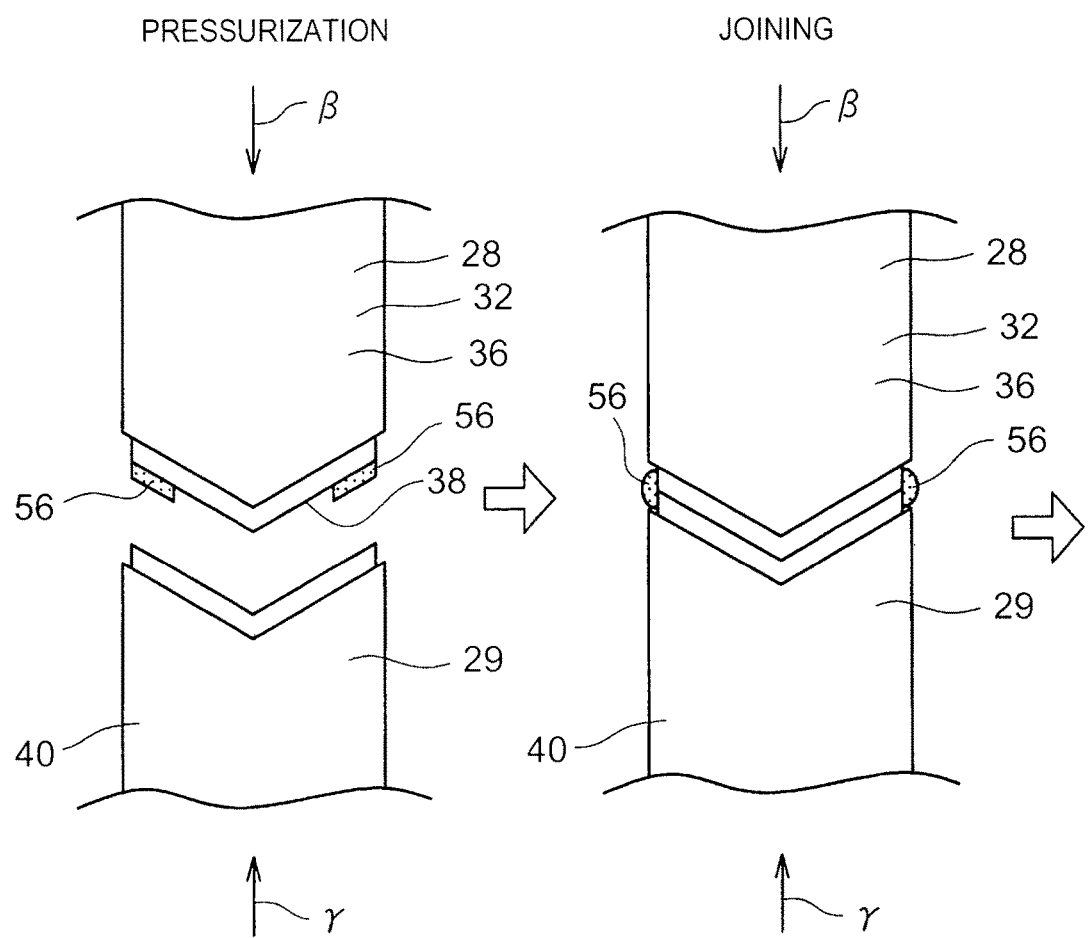
FIG. 12 is a view for showing another example of a method for joining the two conductor segments.

FIG. 12 shows another example of a method for joining the two conductor segments 28, 29. In the other example shown in FIG. 12, as shown by pressurization, a resin adhesive 56 as a binder is applied only to both ends in the circumferential direction (a horizontal direction in FIG. 12) at the tip of the one-side conductor segments 28. Then, the conductor segments 28, 29 are pressurized in the arrow β, γ directions. Accordingly, as shown by joining, the adhesive 56 is projected to the outside of the conductor segments 28, 29. The projected adhesive 56 joins the two conductor segments 28, 29 from the outside. In the other example like this, the two conductor segments 28, 29 can be connected to each other in the state that the conductivity therebetween is favorable. The same applies to a case of joining the two conductor segments 28, 30. A brazing material may be used as the binder instead of the adhesive 56.

Figure 13:
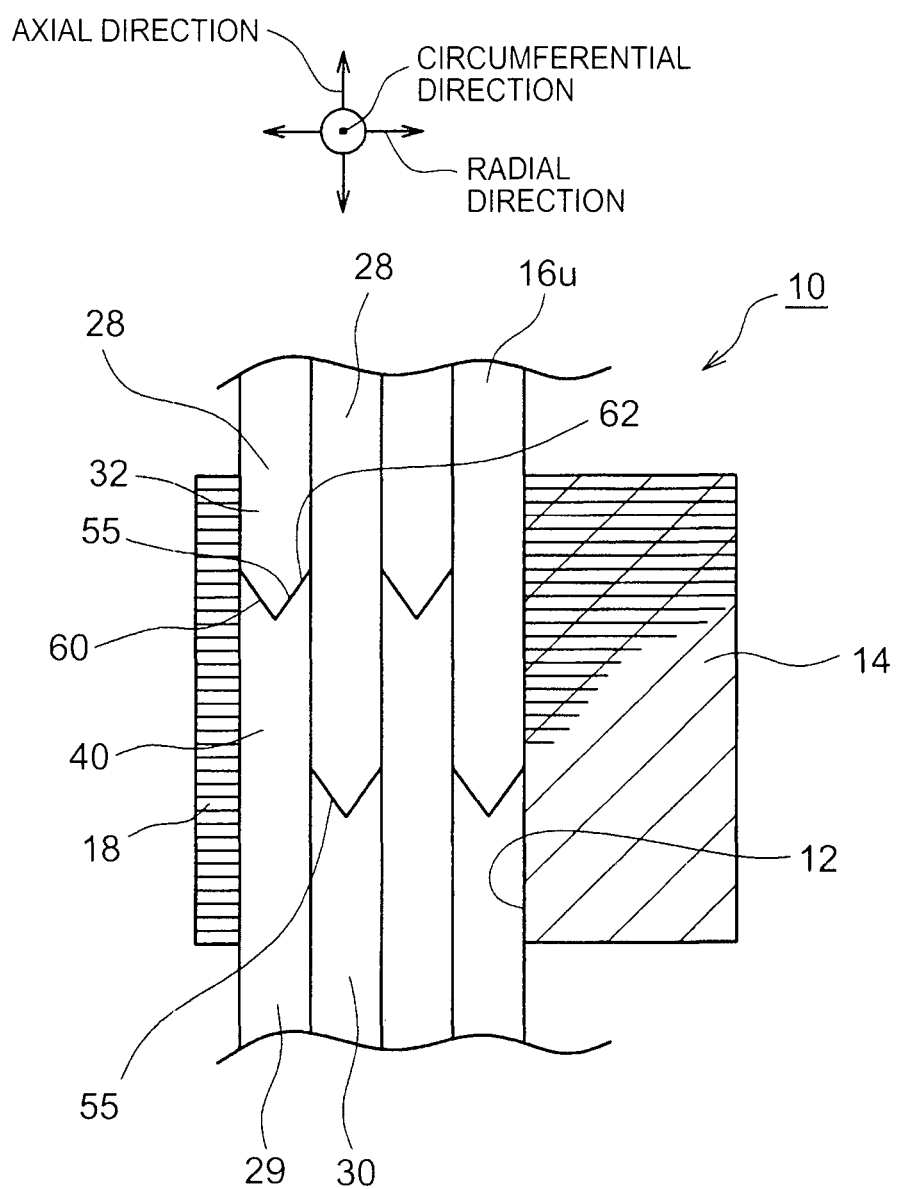
FIG. 13 is a view that corresponds to FIG. 6 and shows another example of the joint section of the plural conductor segments.

FIG. 13 is a view that corresponds to FIG. 6 and shows another example of the joint sections 55 of the plural conductor segments 28, 29, 30. When the stator coil is seen in the circumferential direction of the stator 10, a V-shaped projected section 60 is formed in the tip surface of the one-side leg section 32 of the one-side conductor segments 28. A V-shaped recessed section 62 is formed in the tip surface of the other-side leg section 40 of each of the other-side conductor segments 29, 30. In this case, the tip of the one-side leg section 32 and the tip of the other-side leg section 40 are joined in the joint section 55 in the engaged state with each other by the projection and recess engaging section that is formed by the projected section 60 and the recessed section 62.

Figure 14:
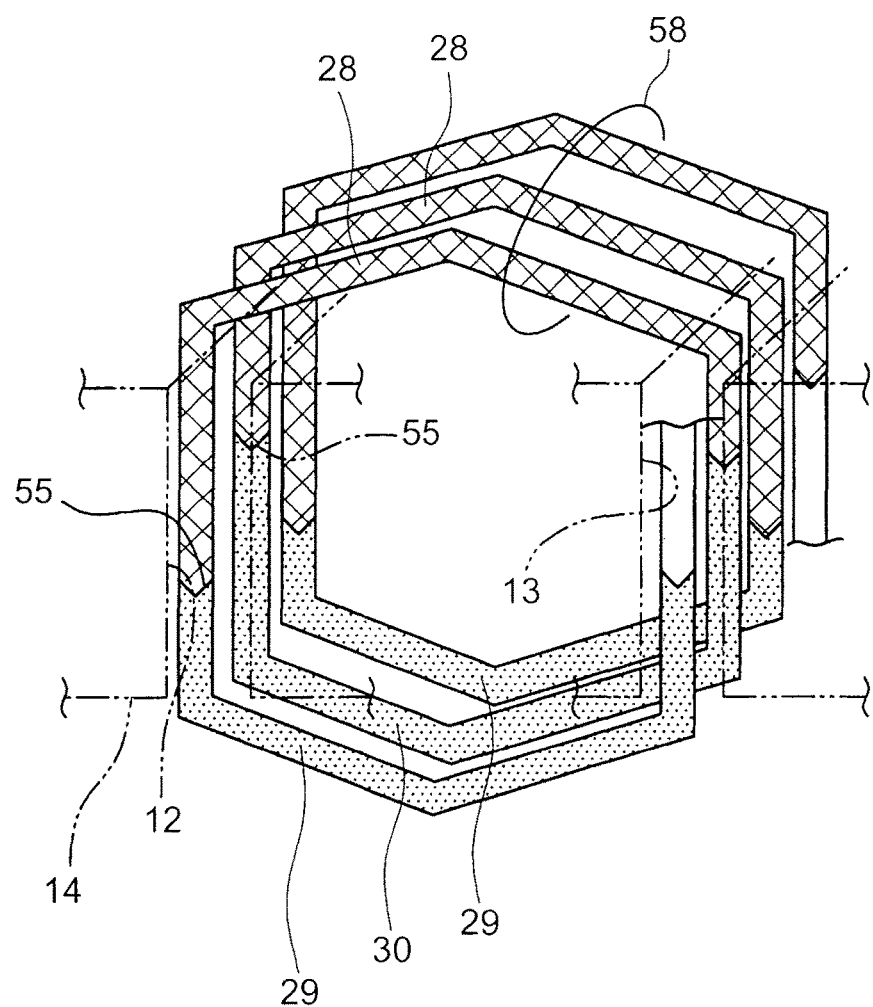
FIG. 14 is a view for showing another example in which a positional relationship among the joint sections of the plural conductor segments is changed in the stator coil for forming the coupling stator coil.

In addition, FIG. 14 shows a case where a stator coil 58 of the coupling stator coil and another stator coil (not shown) that is adjacent to the stator coil 58 are not inserted in the same slots 12, 13. In such a case, as shown in FIG. 14, the joint sections 55 of the conductor segments 28, 29, 30 that are adjacent in the radial direction in the slots 12, 13 may be provided at different positions in the axial direction.

The description has been made so far on the embodiment of the present invention; however, the present invention is not limited to the embodiment described above. It is apparent that the present invention can be carried out in various modes without departing from the gist of the present invention. For example, the joint sections 55 that are adjacent in the radial direction in the same slots 12, 13 may be provided at the same position in the axial direction. In addition, the description has been made on the case where the tips of the I-shaped leg sections of the one-side conductor segments 28 and the other-side conductor segments 29, 30 are joined by the binder. Alternatively, the tips of the leg sections may be joined by welding without using the binder, which is achieved by applying a load that is equal to or larger than a specified value to the tips of the leg sections that face each other in a direction to press each other. Furthermore, the tips of the I-shaped leg sections of the one-side conductor segments 28 and the other-side conductor segments 29, 30 may be abutted against each other to temporarily assemble the stator coil, and then a current that is equal to or larger than a specified value may be applied to flow therethrough to join the tips of the leg sections by welding. Moreover, as the conductor wire for forming, the conductor segment, a wire with a circular cross section or an ellipsoidal cross section may be used instead of the rectangular wire.

The invention claimed is:

1. A stator for a rotary electric machine, the stator comprising:
    a stator core having plural slots; and
    a stator coil including:
    a one-side conductor segment whose first leg and second leg are inserted in first and second slots from one axial end side of the stator core;
    a first other-side conductor segment whose third leg is inserted in the first slot from another axial end side of the stator core; and
    a second other-side conductor segment whose fourth leg is inserted in the second slot from the other axial end side of the stator core, and
    the stator coil configured to be formed such that each of tips of the first leg and the second leg and each of tips of the third leg and the fourth leg that face each other in each of the slots are joined therein and a plurality of the one-side conductor segment and a plurality of the other-side conductor segment are sequentially joined,
    wherein the plural slots are formed in a radial direction of the stator core, a plurality of the first leg and a plurality of the third leg are joined in a first joint section in the first slot, a plurality of the second leg and a plurality of the fourth leg are joined in a second joint section in the second slot, and the first joint section and the second joint section that are adjacent to each other in the radial direction in each of the slots are provided at different positions in the axial direction.

2. The stator according to claim 1, wherein
    tip surfaces of the opposing legs in each of the slots are joined in an engaged state with each other by a projection and a recess engaging section that is formed by a recessed section and a projected section.

3. A stator for a rotary electric machine, the stator comprising:
    a stator core having plural slots; and
    a stator coil including:
    a one-side conductor segment whose first leg and second leg are inserted in first and second slots from one axial end side of the stator core;
    a first other-side conductor segment whose third leg is inserted in the first slot from another axial end side of the stator core; and
    a second other-side conductor segment whose fourth leg is inserted in the second slot from the other axial end side of the stator core, and
    the stator coil configured to join the first leg and the third leg to each other in the first slot and join the second leg and the fourth leg to each other in the second slot,
    wherein the plural slots are formed in a radial direction of the stator core, the stator of the rotary electric machine has a plurality of the one-side conductor segment, a plurality of the first other-side conductor segment and the plurality of the second other-side conductor segment, a plurality of the first leg and a plurality of the third leg are joined in a first joint section in the first slot, a plurality of the second leg and a plurality of the fourth leg are joined in a second joint section in the second slot, and the first joint section and the second joint section that are adjacent to each other in the radial direction in the each slot are provided at different positions in the axial direction.

4. The stator according to claim 3, wherein
    of the legs that are joined in the slot, a tip of one leg has a recessed section, a tip of the other leg is a projected section, and the recessed section and the projected section are engaged.

5. A method for manufacturing a stator for a rotary electric machine, the stator of the rotary electric machine having a stator core with plural slots, the method for manufacturing comprising:
    (a) an insertion step in which a first leg of a one-side conductor segment is inserted in a first slot from one axial end side of the stator core, a third leg of a first other-side conductor segment is inserted in the first slot from another axial end side of the stator core, a second leg of the one-side conductor segment is inserted in a second slot from the one axial end side of the stator core, and a fourth leg of a second other-side conductor segment is inserted in the second slot from the other axial end side of the stator core; and
    (b) a joining step in which the first leg and the third leg are joined to each other in the first slot, and the second leg and the fourth leg are joined to each other in the second slot,
    wherein the plural slots are formed in a radial direction of the stator core, a plurality of the first leg and a plurality of the third leg are joined in a first joint section in the first slot, a plurality of the second leg and a plurality of the fourth leg are joined in a second joint section in the second slot, and the first joint section and the second joint section that are adjacent to each other in the radial direction in each of the slots are provided at different positions in the axial direction.

6. The method for manufacturing according to claim 5, wherein
    in the insertion step, a plurality of the first leg and a plurality of the second leg are simultaneously inserted, and a plurality of the third leg and a plurality of the fourth leg are simultaneously inserted, and
    in the joining step, the legs that are opposed in each of the slots are simultaneously joined.

7. The method for manufacturing according to claim 5 further comprising:
    (d) a preparation step in which a pasty binder that contains conductive particles is applied in advance to at least one of tips of the legs of a plurality of the one-side conductor segment and the legs of the other-side conductor segments, wherein
    in the joining step, the legs that are opposed in each of the slots are brought into contact with each other, pressurized, and heated to harden the binder, and the opposing legs in each of the slots are joined.

8. The method for manufacturing according to claim 5, wherein
the plurality of the one-side conductor segments and the plurality of the other side conductor segments are sequentially joined to form a stator coil.

* * * * *